B. M. MATHIAS.
WIRE ROPE CLAMP.
APPLICATION FILED JULY 26, 1915.
1,261,582.
Patented Apr. 2, 1918.
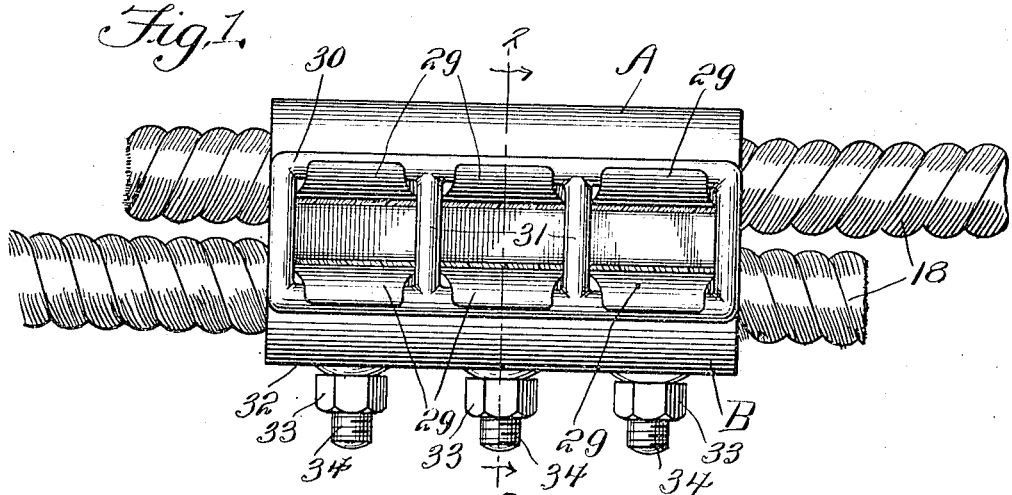
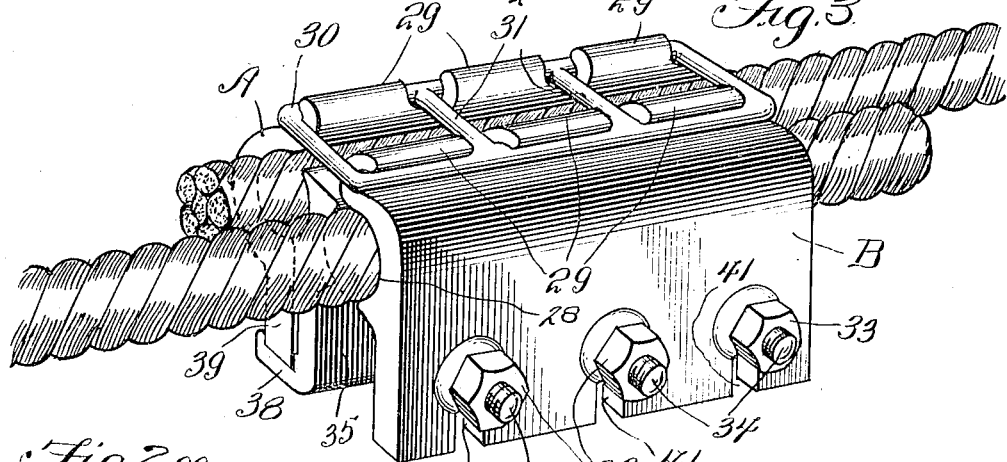
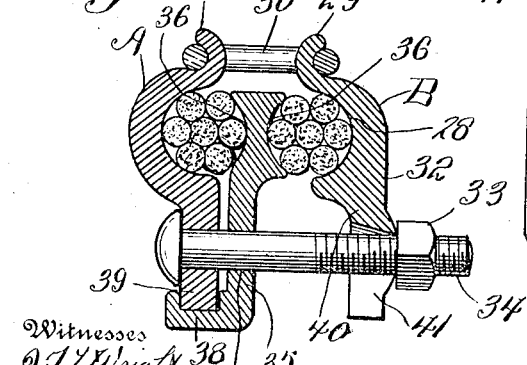
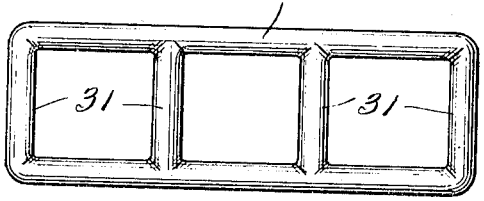
Inventor
B. M. Mathias
By Victor J. Evans
Attorney
Witnesses

UNITED STATES PATENT OFFICE.

BERT M. MATHIAS, OF MINNEAPOLIS, MINNESOTA.

WIRE-ROPE CLAMP.

1,261,582.  Specification of Letters Patent.  Patented Apr. 2, 1918.

Application filed July 26, 1915. Serial No. 41,968.

*To all whom it may concern:*

Be it known that I, BERT M. MATHIAS, a citizen of the United States, residing at Minneapolis, in the county of Hennepin and State of Minnesota, have invented new and useful Improvements in Wire-Rope Clamps, of which the following is a specification.

This invention relates to wire rope clamps or devices that are used for clamping together two sections of wire rope in such fashion as to prevent either from moving longitudinally with respect to the other.

The invention has for its object to produce a simple and improved clamp comprising two swingingly connected clamp members, a tightening bolt by means of which the clamp members may be made to exert a lever grip, and a partition member included between the clamp members, said partition member having a pocket for the reception of the shank of one of the clamp members.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—

Figure 1 is a plan view of a clamp constructed in accordance with the invention.

Fig. 2 is a sectional view taken on the line 2—2 in Fig. 1.

Fig. 3 is a perspective view of the clamp.

Fig. 4 is a detail plan view of the connecting link which constitutes a part of the clamp.

Corresponding parts in the several figures are denoted by like characters of reference.

The clamp members A—B have cavities 28 in the inner faces thereof, and said clamp members are each provided with a series of out-turned hooks 29, said hooks being adapted for engagement with a specially constructed link 30, said link consisting of a rectangular frame having cross bars 31 that are adapted to occupy the interspaces between the hooks 29. The clamp member B is formed with a wall portion having a flat and unobstructed outer face 32 against which the nut 33 of the connecting bolt 34 may be tightened. There is also employed a spacing member 35 interposed between the clamping members and having concave cable engaging faces 36 on opposite sides thereof. The partition member is apertured at 37 for the passage of the connecting bolt, and it is provided at one end with a socket 38 to receive the shank 39 of the clamp member A, said shank being apertured as shown for the passage of the connecting bolt. The shank 40 of the clamp member B has a bolt receiving slot 41. In the drawing a plurality of bolts 34 has been shown, but it is obvious that in a clamp of similar dimensions a single bolt will prove sufficient, although any desired number may be used according to the dimensions of the device. The provision of the socket 38 to receive the shank 39 of the clamp member A enables the said clamp member and the spacing member 35 to be maintained in assembled relation with respect to one of the ropes or objects that are to be connected, by means of the bolt 34, while the said parts are being assembled with the clamp member B and the link 30 with respect to the other rope or object, as will be readily understood by reference to the drawings.

In the form of the invention described and illustrated, the cables will be securely clamped without contacting with each other, thereby preventing mashing of the cables. When the parts are assembled the partition member 35 will be readily guided to its proper location by the socket member 38 which engages the shank 39 of the clamp member A, and longitudinal movement of the clamp members with respect to one another or to the cables will be prevented by the link which is engaged by the hooks 29.

It is obvious that while the improved device has been described as a rope clamp, it may be effectively used for the purpose of joining together sections of rods or the like, as used in reinforcing concrete and for other purposes.

Having thus described the invention, what is claimd as new, is:—

1. A device of the class described comprising two approximately semi-circular clamp members, means whereby said clamp members are connected together for swinging movement with respect to each other at one end thereof, and shanks extending from the other ends of the clamp members, a bolt extending through the shanks and having a tightening nut, and a partition member interposed between the clamps and having concave faces on opposite sides, said partition member being also provided with an aperture for the passage of the tightening bolt and with a socket portion to receive the shank of one of the clamp members.

2. A clamping device of the class described comprising two clamp members each having at one end a plurality of out-turned hooks and each having at the other end a shank, a link engaging the out-turned hooks to connect the clamp members, said link being provided with cross bars engaging the interspaces between the hooks, and a tightening bolt extending through and connecting the shank members together.

3. A clamping device of the class described comprising two clamp members each having at one end a plurality of out-turned hooks and each having at the other end a shank, a link engaging the out-turned hooks to connect the clamp members, said links being provided with cross bars engaging the interspaces between the hooks, and a tightening bolt extending through and connecting the shank members together, in combination with a partition member interposed between the clamp members and having concave faces on opposite sides thereof, said partition member being apertured for the passage of the connecting bolt and provided with a socket to engage the shank of one of the clamp members.

In testimony whereof I affix my signature in presence of two witnesses.

BERT M. MATHIAS.

Witnesses:
IVER C. NELSON,
MYRTLE HAVEN.

Copies of this patent may be obtained for five cents each, by addressing the "Commissioner of Patents, Washington, D. C."